United States Patent [19]

Uno et al.

[11] 4,136,957

[45] Jan. 30, 1979

[54] RECOGNITION DEVICE FOR RECOGNIZING THE SHAPE AND THE POSITION OF AN OBJECT

[75] Inventors: Takeshi Uno, Sayama; Sadahiro Ikeda, Tokyo; Toshikazu Yasue, Hachioji; Masakazu Ejiri, Tokorozawa, all of Japan

[73] Assignee: Hitachi, Ltd., Japan

[21] Appl. No.: 762,126

[22] Filed: Jan. 24, 1977

[30] Foreign Application Priority Data

Jan. 23, 1976 [JP] Japan .................................. 51-5988
Jan. 26, 1976 [JP] Japan .................................. 51-6670

[51] Int. Cl.² ............................................. G01B 11/30
[52] U.S. Cl. ..................................... 356/394; 356/375
[58] Field of Search .......................... 356/156, 167, 3

[56] References Cited

U.S. PATENT DOCUMENTS

| 3,595,220 | 7/1971 | Kawahara | 356/3 |
| 3,713,739 | 1/1973 | Zarenkov et al. | 356/167 |
| 3,976,382 | 8/1976 | Westby | 356/156 |
| 4,053,234 | 10/1977 | McFarlane | 356/156 |

FOREIGN PATENT DOCUMENTS 1009566  11/1965  United Kingdom .................... 356/156

Primary Examiner—John K. Corbin
Assistant Examiner—R. A. Rosenberger
Attorney, Agent, or Firm—Craig & Antonelli

[57] ABSTRACT

A recognition device for recognizing the shape and the position of an object includes means for applying a bundle of parallel light beams having a specific cross-section to a space containing the object, means for transducing the light informations from the space into image signals, means for extracting from said image signals a specific pattern corresponding to the portion to which the bundle of light beams is applied and means for determining the position of the pattern on the image surface, whereby the existence, shape and the position of the object are recognized from the information on the image surface.

10 Claims, 21 Drawing Figures

RECOGNITION DEVICE FOR RECOGNIZING THE SHAPE AND THE POSITION OF AN OBJECT

BACKGROUND OF THE INVENTION

The present invention relates to a recognition device for recognizing the shape and the position of an object and, more particularly, to such a recognition device which can be applied to automatic machines to render the machines operative for objects whose positions are indefinite and capable of correctly selecting a specific object to be processed from a group of objects.

Hitherto, a so-called flying spot scanner has been used as an object information input device for recognizing the shape and the position of an object.

This flying spot scanner operates to apply a single light beam to an object and then converts the light reflected by the object into an electric signal. The arrangement is such that the light beam scans a pattern sufficient to illuminate a wide space partially and successively, while the light-information receiving means are adapted to receive the reflected light non-directionally. Therefore, not only the reflected light caused by the scanning light beam but also the lights issued from other light sources, such as sunshine, are inconveniently received at the light-information receiving means. As a matter of fact, it is almost impossible to correctly discriminate the reflected light corresponding to the scanning light beam from other reflected lights. Thus, the conventional flying spot scanner can work satisfactorily only when the object and the light-information receiving means are maintained in a specific condition or circumstance such as in a shielded dark chamber and, therefore, such an arrangement has limited application.

SUMMARY OF THE INVENTION

It is therefore an object of the present invention to provide a recognition device capable of performing a recognition of the shape and the position of the object regardless of the illuminating condition, i.e. in whatever illumination condition the object may be.

It is another object of the invention to provide a recognition device capable of recognizing the three-dimensional position of an object.

It is still another object of the invention to provide a recognition device adapted to recognize the shape and the position of only a selected object.

To these ends, according to the invention, there is provided a recognition device comprising first means adapted to apply a bundle of parallel light beams having a specific cross-section to a space containing the object to be recognized, second means adapted to transduce the light information received from the space, including at least the portion to which the bundle of parallel light beams is applied, to image signals and third means adapted to extract from the light information a specific pattern corresponding to the cross-section of the bundle and to determine the position of the pattern in the image surface.

These and other objects, as well as advantageous features of the invention will become more clear from the following description of preferred embodiments taken in conjunction with the attached drawings in which:

DETAILED DESCRIPTION OF THE PREFERRED EMBODIMENTS

Figure 1:
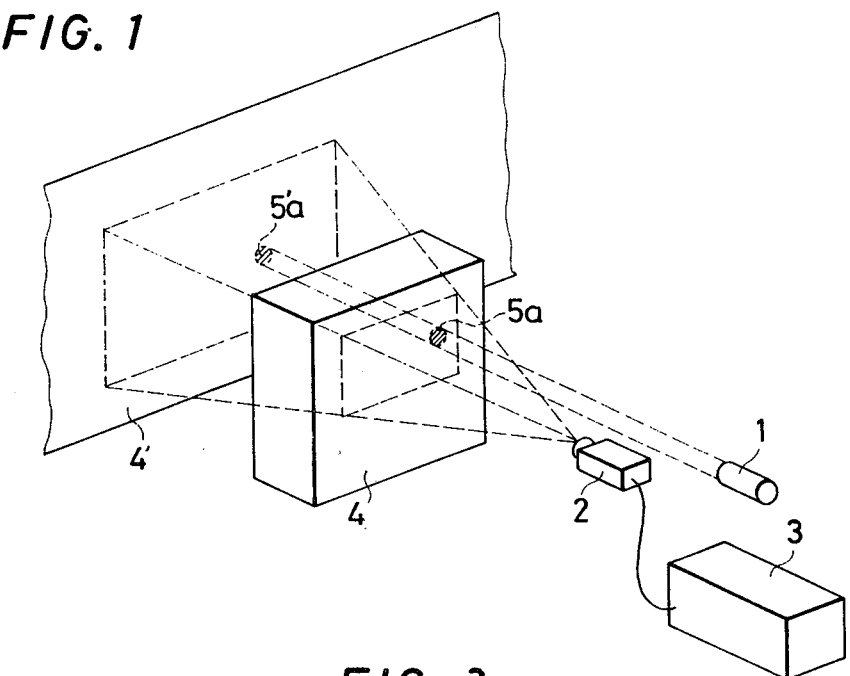
FIG. 1 is a schematic illustration showing a basic arrangement for a recognition device embodying the present invention, FIGS. 2 to 5 inclusive are diagrammatic illustrations for explaining the manner of operation of the recognition device of FIG. 1.

Referring to FIG. 1 which shows a basic arrangement for a recognition device in accordance with the present invention, an illumination device constituting the first means for applying a bundle of substantially parallel light beams is designated by numeral 1. An image pickup device 2, which may be constituted by a conventional television camera, corresponds to the aforementioned second means, while an image processing device 3 corresponds to the aforementioned third means. A rectangular body to be recognized is designated by numeral 4. The path of the bundle of light beams and the visible field of the image pickup device are shown by broken lines, respectively. The cross-section of the bundle of beams is assumed here to be circular. Accordingly, an image as shown in FIG. 2 is obtained at the image pickup device 2, in accordance with the above explained arrangement.

Figure 2:
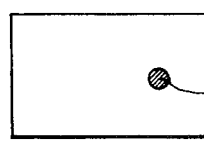

In FIGS. 1 and 2, the portion 5a on the object 4 specifically illuminated by the bundle of parallel light beams and the portion 5b in the image corresponding to the illuminated portion are cross hatched. These are portions of larger intensities than the other portions on the object and in the image, respectively.

As the image of FIG. 2 is produced as an output from the image pickup device 2 as a time-related signal to the image processing device 3, the device 3 acts to search for a portion forming a circular pattern of a larger intensity from the signal delivered from the image pickup device 3, and to determine and output the position of that portion of the image surface.

The output from the image processing device 3 clearly tells, as will be seen from the following explanation, the position of the object.

Figure 3:
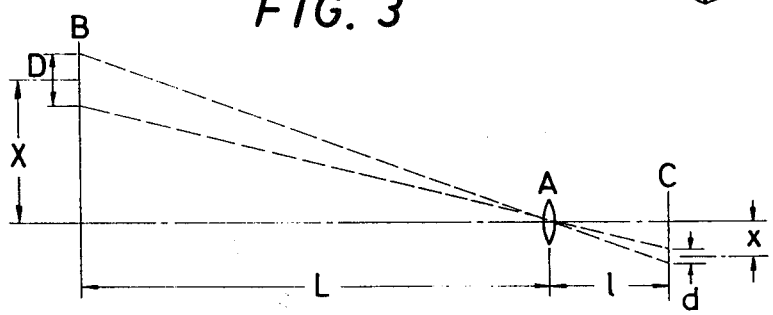

Supposing here that the optical axis of the lens of the image pickup device 2 is spaced from the bundle of parallel light beams by a distance X, the distance L between the lens A and the object B is given, as will be seen from FIG. 3, by the equation:

$$L = X l/x$$

Where, x is the distance between the optical axis of the lens A and the circular pattern in the image surface C, while 1 is the distance between the lens A and the image surface C. Therefore, the distance x is readily obtained, as described above, from the position of the circular pattern in the image surface. Since X and 1 are given, the distance L can be derived from the above equation. Thus, it is recognized that an object which reflects the bundle of parallel light beams resides at a position spaced by the distance L from the lens A of the image pickup device. The three-dimensional position of the object is readily known from the above.

Alternatively, referring to FIG. 3, supposing that a portion having a length D on the object is projected on the image surface C as an image having a length d and that the diameter of the bundle of parallel light beams is constantly equal to D regardless of the value of L, the distance L is directly obtained from d in the image surface, since 1 is known.

Thus, the existance of an object which reflects the bundle of parallel light beams is recognized at a position in a plane perpendicular to the optical axis of the lens A of the image pickup device 2 spaced from the lens A by a distance L, by detecting the portion forming a circular pattern of a larger intensity in the image signal, measuring the diameter d of that portion in the image surface and then substituting the measured diameter d in the aforementioned equation. This way of determining the position of the object is preferable in that it is less affected by a deterioration of the parallel relationship between the optical axis of the lens A and the bundle of the light beams, and in that the distance L can be determined irrespective of the distance X between the optical axis of the lens and the bundle of parallel light beams.

Figure 4:
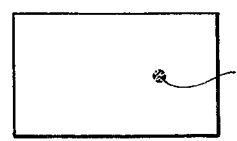

Turning again to FIG. 1, supposing that no object is present, the bundle of the parallel light beam advances further to reach and illuminate a portion 5a' of a back wall 4', for example. Broken lines represent the path of the bundle of parallel light beams and the visible field of the image pickup device 2. Since the visible field of the image pickup device 2 is larger on the more remote object, i.e. the back wall 4', than on the closer object 4, although the cross-section and the size of the bundle of light beams are constant irrespective of the distance travelled by the bundle, as will be seen from the Figure, an image as shown in FIG. 4 is obtained for the more remote object, i.e. the back wall, while the closer object 4 provides an image as shown in FIG. 2. From this it will be seen that the portion 5b' in the image surface corresponding to the illuminated portion 5a' on the more remote object 4' is smaller than the portion 5b in the image surface corresponding to the illuminated portion 5a of the closer object 4. This is a typical illustration of the fact that the length L between the image pickup device 2 and the object 4 (or 4', or broadly the portion illuminated by the bundle of the parallel light beams) can be directly obtained from the diameter d of the higher intensity light in the image surface or from the distance x from the optical axis.

An explanation will be made hereinunder as to a practical example of the third means for searching or detecting the portion having a circular pattern and a higher intensity, in the image signals as shown in FIG. 2 or FIG. 4.

As is well known, the image television signal is produced by horizontal scanning in the vertical direction, i.e. by a so-called standard television scanning system, so as to convert the intensity of light into a time-related voltage signal. For example, in the image surface as shown in FIG. 5, the uppermost broken line is at first scanned in the direction x, then the second broken line is scanned in the direction x and the lower broken lines are succesively scanned in the same direction.

Figure 6:
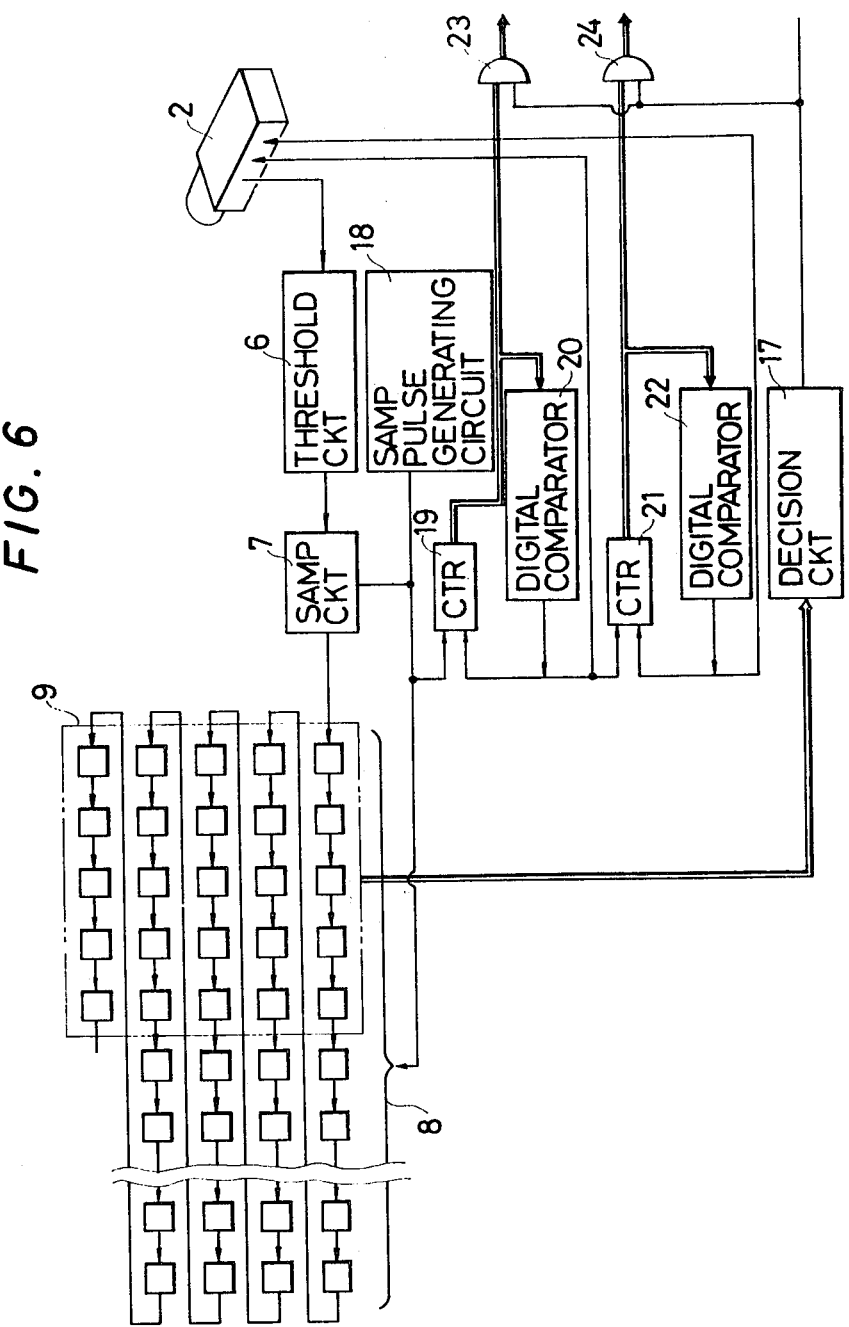
FIG. 6 is a schematic block diagram of the image processing means incorporated in the recognition device of FIG. 1, FIGS. 7 to 9 inclusive are schematic diagrams showing different circuits constituting a part of the circuit of FIG. 6, respectively.

Referring to FIG. 6 showing a practical example of an image processing device incorporated in the recognition device of FIG. 1, a threshold circuit 6 is provided for converting the time-related signal obtained from a television camera into binary signals of one bit in such a manner that the voltage exceeding a predetermined threshold voltage corresponding to a predetermined intensity of light is entered as 1 (one). More particularly in this binary signal, the portion of the image signal corresponding to the illuminated portion on the object is entered as 1 (one), while the remainder is counted as zero.

The binary signals are then sampled by a sampling circuit 7 for each constant period to become data or samples carrying information to be processed.

Figure 5:
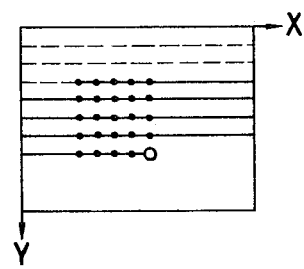

The image information is thus dispersed and separated in both x and y, directions in FIG. 5. Each sample point will be referred to as a "picture element" hereinafter.

Supposing here that the period of the sampling is 167 nanoseconds (This corresponds to a sampling frequency of 6 MHZ), and that a horizontal synchronizing signal and a vertical synchronizing signal are provide for each 382 samples and for each 262 horizontal synchronizing signals, a scanning similar to that of the standard television scanning system is performed at the television camera to produce an effective image signal consisting of 320 picture elements in the horizontal (i.e. in the x) direction and 240 picture elements in the vertical (i.e. in the y) direction.

The output from the sampling circuit 7 is then delivered to a shift register 8 adapted to perform a shifting operation in the direction of the arrow for each sampling period. Each of the square frames in FIG. 6 forms a register of one bit. The square frames are arrayed in a plurality of lines each of which consists 382 square frames. Namely, one line can transmit the information contained in one scanning line.

For the purpose of simplification of the drawing, an assumption is made here that the image of the portion illuminated by the bundle of the parallel light beams is covered by the picture elements of five lines and five columns. To this end, it is required to provide five registers in addition to the number contained in 4 lines (i.e. 382 × 4 + 5) and to read out the content of the registers encircled by the broken line, i.e. the resisters of five lines and five columns (5 × 5).

Observing the relationship between the content stored in the shift register 8 of FIG. 6 and the picture elements on the image surface of FIG. 5, the following will be noted. The picture element designated by the white or blank circle which corresponds to the instant of the scanning is stored by a register directly connected to the output of the sampling circuit 7 so that the picture elements designated at white and black points or circles are stored by the readable registers of five lines and five columns encircled by the broken line of FIG. 6. Thus, the shift register 8 of FIG. 6 as a whole stores the picture elements contained by the scanning lines shown by full lines in FIG. 5.

As the scanning is continued, the region readable by the registers in the broken line of FIG. 6 is shifted from left to right or from top to bottom in FIG. 5, so that the region of the five lines and five stages travels over the entire image surface by the time the scanning is completed over the entire image surface. It will be understood that the circular pattern existing in the image signal is surely detected, when continued evaluation of the data indicates that the picture elements of the registers of the five lines and five columns form a circular pattern constituted by a plurality of 1 (one) bits.

Figure 7:
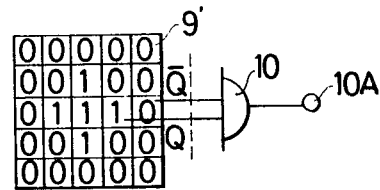
Figure 8:
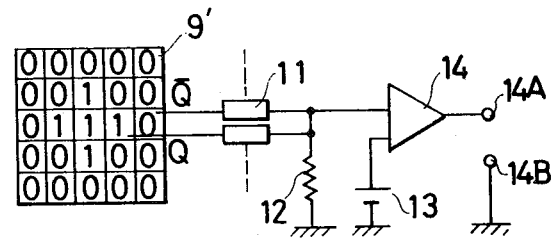
Figure 9:
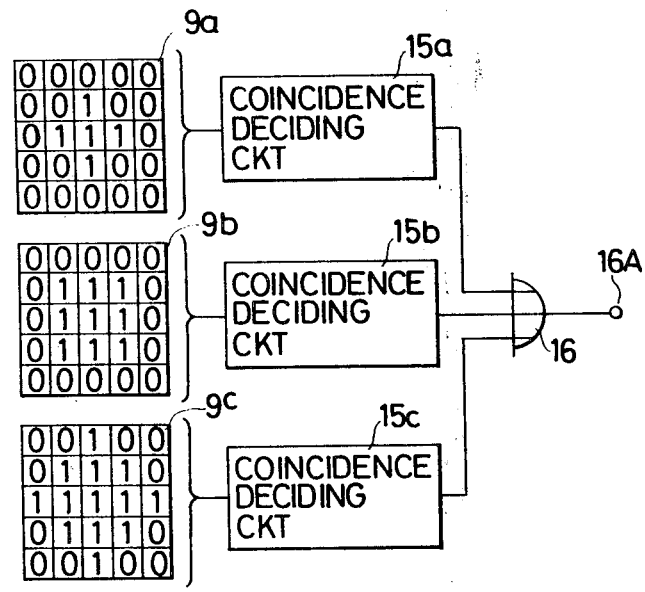

FIGS. 7 to 9 show examples of circuits for deciding whether the picture elements of the five lines and five columns form a circular pattern constituted by 1s (ones). Referring to FIG. 7, the readable five lines and five columns of registers 9 among the registers 8 of FIG. 6 are designated at 9'. It is assumed that the circular pattern sought is constituted by 1s (ones) of the central five picture elements and 0s (zeroes) of the other picture elements. The arrangement is such that an output of "1" (one) is obtained at a terminal $\bar{Q}$ when all of the contents of the central five registers are 1 (one), while an output of "1" (one) is obtained at another terminal Q when all of the contents of the other registers are zero. The output from the 25 registers are then applied to an AND circuit 10, through the terminals Q and $\bar{Q}$, so that a signal 1 (one) may be obtained at a terminal 10A of the AND circuit only when the objective circular pattern is detected in the contents of the 25 registers.

It will be seen that the AND circuit 10 outputs a "0" (zero) bit when information from at least one of the 25 picture element is different from that necessary for constituting the objective circular pattern. Thus, as a matter of fact, the circuit of FIG. 7 may erroneously function due to an occasional reversing of the contents of registers which happen to be caused in practice by various factors.

FIG. 8 shows a circuit modified to avoid the above explained shortcoming of the circuit of FIG. 7. The terminal Q is adapted to output the information on the registers corresponding to the objective circular pattern, while the terminal $\bar{Q}$ is to transmit the output from the registers corresponding to the "0" bits of the circular pattern. Connected to each terminal is a circuit 11 consisting mainly of a resistance adapted to act as a group of current sources for the ground when the output from the terminal is 1 (one). A maximum of 25 current sources thus formed are then connected to a resistance 12. Therefore, an electric current corresponding to the extent of conformity of the content carried by the registers 9 with the objective circular pattern is caused to flow through the resistance 12, to produce a corresponding voltage between the ends of the resistance 12. A voltage source 13 is adapted to provide a threshold voltage to evaluate the voltage generated at the resistance 12. A differential amplifier of a sufficiently large gain is adapted to be supplied with the differential between the threshold voltage given by the voltage source 13 and the voltage obtained at the resistance 12, so that an output of "1" (one) bit may be obtained between the terminals 14A and 14B when the extent of the conformity is determined to be acceptable, while an output of "0" (zero) is obtained when the extent of the conformity is judged to be unacceptable.

The above described circuit of FIG. 8 is designed particularly for judging the extent of conformity of the content of the registers 9 with the objective circular pattern. FIG. 9 shows a circuit for judging whether the size of the circular pattern carried by the registers 9 is within a predetermined range of sizes. In FIG. 9, numeral 9a denotes the same elements which were designated 9' in FIG. 8, while a coincidence deciding circuit 15a includes the elements 11, 12, 13 and 14 of FIG. 8. Numeral 9b denotes a pattern of a circle slightly larger than the circular pattern 9a, while numeral 9c denotes a still larger circular pattern. Coincidence deciding circuits 15b and 15c are similar to the circuit 15a excepting that they have different threshold voltages.

The coincidence deciding circuits 15 are so arranged as to provide respective outputs of "1" bit when they are in the ON state. The outputs are adapted to be delivered to an OR circuit 16. Thus, an output of "1" (one) is obtained at a terminal 16A when at least one of the outputs from the conformity judging circuits is "1" (one), which means that the circular pattern carried by the registers 9 is of a size within a predetermined range of sizes.

It is to be noted that the registers 9a, 9b and 9c need not be constituted by three separate or individual sets of registers but may be constituted by one set of registers 9 with three different types of connection for obtaining the respective outputs.

In FIG. 6, the circuit 17 is a decision circuit similar to those of the circuits of FIGS. 7, 8 and 9, and is adapted to evaluate the extent of the conformity of the content of the registers 9 with the objective circular pattern, and the result of the evaluation constitutes one of the outputs from the circuit of FIG. 6.

A sampling-pulse generator 18 is adapted to produce pulses of, for example, a frequency of 6MHz. The pulse is applied to the sampling circuit 7 for the sampling, to the shift register 8 to provide the shift timing and to a counter 19. The counter 19 is provided for determining the position of the scanning at every moment or instant on the x axis, i.e. along the abscissa. Thus, the output from the counter 19 is delivered to a digital comparator 20, so that the comparator 20 may reset the content of the counter to "0" (zero) when the counted number reaches 382, thereby to deliver a horizontal synchronizing signal to the television camera 2 and to deliver a pulse to another counter 21.

Another counter 21 is provided for determining the position of the scanning at every moment or instant on the "y" axis, i.e. along the ordinate. The output from the counter 21 is delivered to another digital comparator 22 which is adapted to reset the content of the counter 21 to "0" (zero) each time the count reaches 262. Simultaneously with the resetting of the counter 21, a vertical synchronizing signal is delivered to the television camera 2.

The counted valves counted by the counters 19 and 21 are then delivered to gates 23 and 24, respectively, and are taken out as the representative of the scanning position in the x-y coordinate when the output from the judging circuit 17 is "1" (one).

In FIG. 6, paths for transmitting information consisting of a plurality of bits in parallel are shown by double-lines. Thus, the gates 23 and 24 are constituted, respectively, by a number of gate circuits corresponding to the number of bits.

As described, the recognition device of the invention is comprised of illumination means for producing a bundle of parallel light beams of a given cross-section, means for picking up the image of an object to which the bundle is applied, and an electronic circuit for detecting a pattern corresponding to the crosssection of the pattern on an image surface, whereby the existence of the object, as well as the three dimensional position thereof is recognized.

Namely, the outputs from the gates 23 and 24, respectively, provide the position of the image along the x and y axes, respectively, which in turn provides the distance x as shown in FIG. 3. The distance L can be derived from the thus obtained distance x. Alternatively, when it is judged by the decision circuit 17 that a specific pattern exists, the length d in FIG. 3 can be determined from the number of bits appearing as "1" (one) in the register 9. Then, the distance L is obtained from the distance d. It will be understood that the position of the object is determined in a three-dimensional coordinate. This information is essential and basic to proper recognition of the position and the shape of the object. As will be explained hereinunder, further detailed informations on the object become available by repeating the described processing with different positions of illumination.

When the position of the illumination is kept stationary, only limited information is available about the object, since only a portion of the object is subjected to the illumination, as far as the object itself is not moved. Thus, the various aspects of the object become more clear as the processing is repeated with different positions of illumination.

Figure 10:
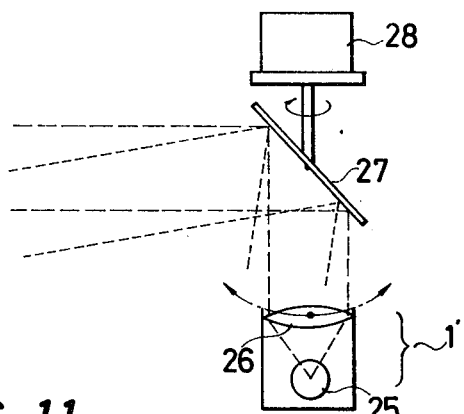
FIG. 10 is a schematic illustration showing a practical arrangement for illumination means incorporated in the recognition device of FIG. 1.

FIG. 10 shows an illumination means capable of changing the direction in which the bundle of parallel light beams runs so as to provide different illuminated positions on the object. A bundle of parallel light beams as shown by broken lines is obtained when a light source 25 is positioned at the focal point of a convex lens 26. Numerals 27 and 28 denote, respectively, a mirror and a motor adapted to rotate the mirror in the direction of the arrow. As the motor 28 is energized to rotate the mirror 27, the bundle of parallel light beams scans along a plane normal to the axis of the driving shaft of the motor 28 passing through the center of the mirror 27.

Figure 11:
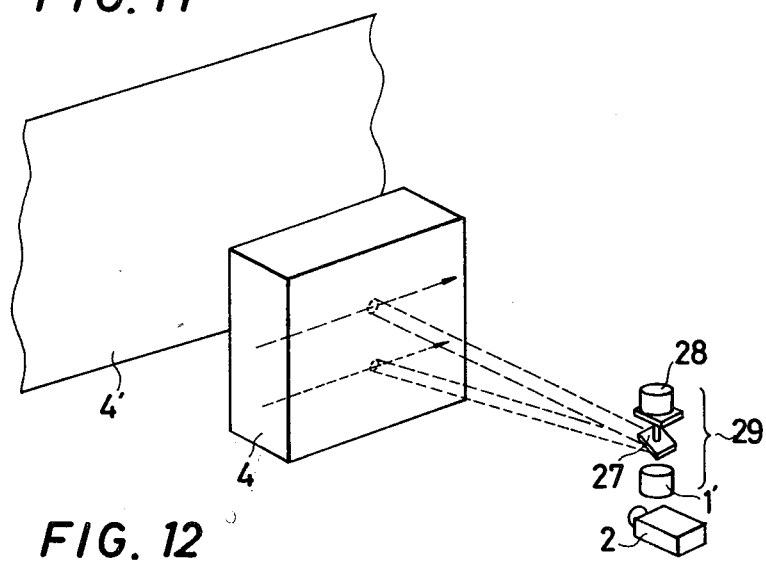
FIGS. 11 and 12 are schematic illustrations explanatory of the manner of operation of the illumination means of FIG. 10, FIGS. 13a to 13c are schematic illustrations explanatory of the manner in which a specific pattern of a beam-bundle used in the recognition device is tracked, FIG. 14 schematically illustrates another basic arrangement of the recognition device in accordance with the invention.

FIG. 11 shows the illumination pattern produced on the object 4 and the wall 4' as mentioned in connection with FIG. 1, by means of the illumination device 29 equipped with the scanning mechanism of FIG. 10. As the mirror 27 is rotated by the motor 28, the illuminated portion on the object is shifted as designated by the broken-line arrow. Turning again to FIG. 10, the direction in which the bundle of light beam reflected by the mirror runs can be varied up and down on the drawing, when the angle formed by the mirror 27 and the bundle of light beams produced by an illumination source 1' constituted by the light source 25 and the convex lens 26 is varied. Namely, this bundle of parallel light beam is moved to a position as shown by broken lines to achieve the purpose, as the illumination source 1' is moved in the direction of the dot-and-chain line arrow. Alternatively, the same effect is obtained by changing only the angle of the mirror 27 with respect to the axis of the shaft of the motor 28, with the position and the orientation of the illumination source 1' being unchanged as shown in FIG. 1. Consequently, the spot or illuminated portion on the object 4 is moved as shown by broken lines in FIG. 11, as the direction of the scanning is changed. The change of the direction of scanning may be performed manually, although an automatic two-dimensional scanning similar to the standard television scanning system can obviously be adopted using a controlling and driving means which is simple and, therefore, is not described here in detail.

Figure 12:
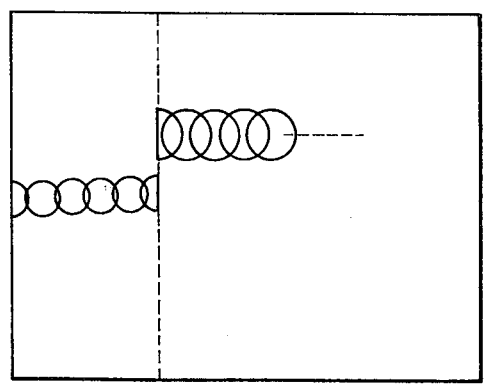

According to the arrangement of FIG. 11, the television camera 2 can pick-up images, for example, as shown in FIG. 12. In FIG. 12 images of the wall 4' are shown at the left-hand side of the vertical broken line, while images of the object 4 are shown at the right-hand side of the broken line, respectively.

The circles represent the pattern or profile of the illuminated portion at each different moment during the scanning. As aforementioned, when the illuminated object is positioned remote from the television camera 2, the portion corresponding to the illuminated portion is relatively small with respect to the whole image, as is the case of the wall 4', while the size of the pattern or the profile is relatively large when the illuminated object is relatively close to the camera 2, as is the case of the object 4. This fact can be utilized advantageously as explained below.

When the distance between the television camera 2 and the object 4 is known, the size of the image corresponding to the illuminated portion on the object 4 can be detected. Then, the size of the circular pattern to be extracted by the circular-pattern extraction circuits of FIGS. 7 to 9 is selected to coincide with the above-mentioned size of the image of the illuminated portion. At the same time, the range of the sizes to be extracted is selected to be relatively narrow. Then, in the image as shown in FIG. 12, only the circles at the right-hand side of the broken line are extracted. The positions of these circles or, more strictly, the positions of the centers of these circles in the coordinate array shows the range within which the object is located. This information is concerned with the shape and the position of the object. Thus, detailed information concerning the shape and the position of the object is obtained by repeating the processing with different positions to which the bundle of light beams is applied, the processing at each time includes applying the bundle of parallel light beams to an object, detecting a pattern corresponding to the cross-section of the bundle of parallel light beams and of a size within a predetermined range and determining the position of the detected pattern in the coordinate array.

The information concerning the position thus obtained are is available for automatically discriminating a specific object by its shape, and can be utilized in an automatic handling of the object especially when combined with the information concerning the position, which well conforms and satisfies the various industrial needs very well.

Since the intensity of light on the object provided by a bundle of parallel light beams is constant irrespective of the distance between the illumination device and the object, the recognition is performed effectively even for objects positioned remote from the illumination device. In addition, since an illumination intensity greatly exceeding that provided by the surrounding light, sunshine, is obtainable on the object with a relatively small electric power, the recognition device of the invention is also effective even for outdoor-recognition.

Even if the illumination is not strong enough to overcome the ambient light provided by, for example, sunshine, there is such a small difference in intensities between the portion to which the bundle of parallel light beam is applied and the remaining portions that it is possible for the processing device to extract the pattern corresponding to the cross-section of the bundle of parallel light beams advantageously provide the desired recognition.

An example of means which provide a secure and stable recognition of the presence, shape and the position of an object will be described hereinafter. The means are comprised of first means adapted to produce an image signal from a light information delivered from a space containing an object. Said image signal consists of a binary signal corresponding to dark and bright portions, second means for extracting a specific pattern from the image signal and for determining the position of the pattern in a coordinate array, and third means for judging the difference between any number of positions in the coordinate array obtained by operating the first and the second means and any number of positions in the coordinate array previously obtained in the same manner.

The recognition device may include as required fourth means for shifting the region of the third means in accordance with a previously known condition of movement of the specific pattern. The recognition device may further include fifth means for shifting the region of the operation of the third means in accordance with a tendency of movement of the moving specific pattern, which tendency is obtained from the position of the pattern in the coordinate array by a previous operation of the first, second and the third means.

The recognition means can further include as necessitated a sixth means adapted to actuate the first and the second means when it is previously known that the moving specific pattern is not included by the image signal, and to actuate the first, second and the third means when there is a possibility that the moving specific pattern is included in the image signal.

The first means may consist of an image pick-up device having a somewhat specific function. Thus, the first means may be constituted by such means including a threshold circuit for transducing the image signal into a binary signal in such a manner that a bright signal of an intensity exceeding a threshold value is judged to be "1," while a dark signal of an intensity smaller than the threshold value is judged to be "0," and the means is further capable of separating or subdividing the signal for a unit of time, i.e. for a unit of space for the image signal. Thus, when a camera incorporated in the system has an array of solid image pickup elements, only the threshold circuit is additionally required for transducing the image signal into a binary signal, since the camera itself can perform the separation or subdividing of the signal for a unit of space.

The second means is adapted to make at least a part of the subdivided binary signals hold a certain spacious array and to judge whether the condition of the array of the signals constitute a specific pattern, and, in addition, to determine the position of the array when the specific pattern is formed. Thus, the elements 8, 9, 17 and 19 to 24 of FIG. 6 may constitute the second means.

The third means are expected to perform the following function. An assumption is made here that the number of the specific pattern included by the image signal obtained when the first and the second means are operated for an i period of time is ki and its position is represented in a coordinate array as $(X_{i,j}, y_{i,j})$, $(j = 1, 2 \ldots k_i)$. The third means is adepted to determine the position $(X_{n,j}, Y_{n,j})$ $(j = 1, 2 \ldots k_n)$ when the first and the second means are operated for the nth time, and is further adapted to identify this position with a position $(X_{n-1,j}, Y_{n-1,j})$ $(j = 1, 2 \ldots k_{n-1})$ which has been obtained at the time of the (n−1)th operation, thereby to judge whether there is a difference therebetween. However, it is to be noted that the positions above mentioned must be located within a range which is specifically given.

At the same time, it is to be pointed out that the coincidence of $X_{n,j}'$ with $X_{n-1,j}''$ and the coincidence of $Y_{n,j}'$ with $Y_{n-1,y}''$ are not a requisite for the conformity of two positions. Namely, the requiste is that the distance between the two positions $(X_{n,j}', Y_{n,j}')$ and $(X_{n-1,j}'', Y_{n-1,j}'')$ is within a certain range E of distance. In other words, two positions are judged to coincide when the following equation is satisfied.

$$\sqrt{(X_{n,j}' - X_{n-1,j}'')^2 + (Y_{n,j}' - Y_{n-1,j}'')^2} \leq \epsilon$$

More simply, the two positions are judged to coincide with each other, when the following two equations are satisfied.

$$(X_{n,j}' - X_{n-1,j}'') \leq \epsilon$$

$$(Y_{n,j}' - Y_{n-1,j}'') \leq \epsilon$$

Thus, the third means acts to identify the positions obtained by the nth processing and those of the (n−1)th processing. There may be some positions which have no corresponding positions to be identified. These positions are, for example, $(X_{n-1,j1}, Y_{n-1,j1})$     (1)

$(X_{n-1,j3}, Y_{n-1,j3})$     (2)

$(X_{n,j5}, Y_{n,j5})$     (3)

and $(X_{n,j6}, Y_{n,j6})$     (4).

Among the above listed positions, the positions (1) and (2) are those which existed at the time of the (n−1)th operation but cannot be sensed at the time of the nth operation. Thus, the specific patterns which surely existed at the positions (1) and (2) in the coordinate array have been moved or extinguished by the time of the nth operation. In contrast to the above, the positions (3) and (4) are those which did not exist at the time of the (n−1)th operation but have come to exist by the time of nth operation. Thus, the specific patterns at these portions (3) and (4) are considered to have been moved to these positions or to be newly produced.

Supposing here that the distance travelled by a moving object during an interval between the successive operations and the direction of movement of the object are previously known, e.g., supposing that the object moves in the X-direcction by a distance of 3 and in Y-direction by a distance of −2, the pattern at the position (3) may be judged to be the pattern which was at the position (1) at the time of the (n−1)th operation and has been moved to the position (3) by the time of the next operation, i.e. the nth operation, when the following equations are simultaneously satisfied.

$$(Xn,j5 - (Xn-1,j1 + 3)) \leq \epsilon$$

$$(Yn,j5 - (Yn-1,j1 - 2)) \leq \epsilon$$

Thus, finally, the patterns at the positions (4), (2) are judged to be newly generated and extinguished specific patterns, respectively, while the pattern at the position (3) is judged to be the specific pattern which has moved from the position (1).

The patterns identified are considered to be the specific patterns which have been kept stationary during the interval between the nth and the (n−1)th operations.

In the fourth means, the positions to be identified are limited to those included within a predetermined range in the coordinate, as aforementioned. This is because the number of the specific patterns is conveniently reduced by such a limitation that the identification can be performed on a smaller scale thereby to advantageously reduce the time required for processing and to enable a minor processing apparatus to perform the satisfactory processing. In general, for specific systems, the positions at which the specific pattern is newly generated, moved or extinguished, as well as the tendency of such a change can be forecasted with a certain degree of exactness, so that the limitation of the specific range for identification does not cause a substantial problem.

Assuming that the number of the extracted specific patterns is m, the number of processing steps well reaches $m^2$. It is possible that the number of the extracted specific patterns is 100, when the whole image surface is taken into consideration. Then, the number of the required processing steps disadvantageously reaches about 10000. However, when a specific range is determined to include only m′ patterns, only $m'^2$ processings are required. Since the area of the region can be determined regardless of the visible field of the first means, it is possible to select a small range so as to include a small number of m′ of patterns, typically 2 or 3, so as to obtain a satisfactorily reduced number of the processing steps.

As is the case of the last mentioned embodiment, the effect derived from the limitation of the range is remarkable especially when the positions and tendency of the change, such as the generation, movement and the extinguishment, are previously known or well forecasted. When many patterns similar to but different from the specific pattern exist, it is very troublesome to take the movement of such patterns into consideration. This troublesome work can be dispensed with by limiting the range for identification.

The fourth means are adapted to progressively shift the region for the identification, taking the direction and the speed of the moving object into consideration, when they are previously known, during the repetition of the operations of the first, second and the third means.

The fourth means thus provides an easier tracking of the moving specific pattern. Namely, supposing that the specific pattern moves in the x-direction by +3 and in the y-direction by −2 during an interval of adjacent cycles of operation, as is the case of the aforementioned example, the moving pattern will surely be included in the range, if the range itself is moved or shifted in the same direction by the same distance, i.e. by +3 in the x-direction and by −2 in the y-direction. In addition, the more precisely the displacement of the specific pattern is forecast, the smaller will be the range required to surely contain the moving specific pattern, so that the aforementioned value m′ can be made much smaller.

Various types of information can be used concerning the movement of the specific pattern. In one case, the position of the pattern at a specific moment may be known, while, in another case, the direction and the speed at a moment may be given. Even the acceleration at a specific moment can be utilized for determining the position of the moving pattern. The range of identification can be selected easily in each case. However, for example, in the case where the direction and the speed of movement of the specific pattern are known, it is necessary to use an additional means to detect the position of the pattern at a specific moment. Of course, the first and the second means having a function of determining the position of the specific pattern may be used as the means for detecting the position of the moving pattern.

Since the fourth means relies upon the nature of movement of the specific pattern, the means may be rendered impractical when the nature of the movement is changed or not detected correctly. To avoid this, a fifth means having the following function is provided.

The fifth means provides a good tracking of the moving specific pattern even when the nature of the movement is not satisfactorily known by automatically calculating the range for identification and other data expected for the next cycle of operation from the position and the nature of movement of the specific pattern provided by the previous operation of the first to the third means.

In order to optimum positioning of the range for identification, for example, for the (n + 1)th cycle of processing, assuming that it has been confirmed that the pattern of the position (Xn,j′, Yn,j′) at the nth processing and the pattern of the position (Xn−1,j″, Yn−1,j″) are identified to be the same specific pattern, the displacement or the distance travelled by the specific pattern during the time interval between the (n − 1)th and nth cycle of operation may be added to the position in the coordinate of the specific pattern at the nth cycle of operation. Thus, the optimum position (X′n+1, Y′n+1) of the center of the identification range may be given by the following equations.

$$X'n+1 = 2Xn,j' - Xn-1,j''$$

$$Y'n+1 = 2Yn,j' - Yn-1,j''$$

The position (X′n+1, Y′n+1) in the coordinate will be rendered more optimum, when the positions of the pattern at the cycles preceding to be (n−1)th cycle of operation.

Supposing that the position of the specific pattern at the time of the (n31 2)th operation is located in the coordinate as (Xn−2,j‴, Yn−2,j‴) and representing the period of operation and the moment of the nth operation by Δt and t0, respectively, the average or mean velocity of the moving pattern is given by (Xn,j′ − Xn−1,j″/Δt, Yn,j′ − Yn−1,j″/Δt), while the means acceleration from the moment t0−2Δt to t0 is given by (Xn,j′ − 2Xn−1,j″ + Xn−2,j‴/Δt², Yn,j′ − 2Yn−1,j″ + Yn−2,j‴/Δt²).

In addition, the change in angle or direction of movement during the moments t0 to t0 +Δt can be obtained.

It will be understood that the detection of the position is rendered more free from minor fluctuations in the movement of the specific pattern, when the positions in the coordinates at a plurality of preceding cycles of operation are taken into consideration to obtain the average or mean speed and direction of the movement of the specific pattern.

The sixth means is adapted to perform a first step prior to the first and the second means when it is previously known that the moving specific pattern is not included by the imagery signal thereby to extract a specific pattern contained in the imagery signal and to remember the position thereof in the coordinate, and a second step of actuating the first, second and the third means when there is a possibility that the moving specific pattern may be included by the imagery signal and to extract the pattern for the identification thereof with the positional information remembered in the first step.

The sixth means effectively provides a selection of the specific pattern newly moved to the range of identification. This in turn provides, not only the discrimination of the stationary specific pattern from the moving specific pattern, but also a selection of the desired specific pattern from various similar but different patterns, as will be explained below.

An assumption is made that there is provided illumination means for applying a bundle of light beams having a circular cross-section and that the pattern to be extracted by the second means is circular. When the first and the second means are actuated with the illumination means being deenergized, the imagery signal does not include the circular pattern which would otherwise be produced by the spot caused by the illumination, although similar patterns caused by other light sources may be picked up.

Subsequently, the first, second and the third means are actuated with the illumination means being energized. Then, the imagery signal obtained by the first means necessarily includes the specific circular pattern caused by the illumination means. This pattern is extracted by the second means and the third means effectively selects only this specific circular pattern from other patterns. The selected pattern clearly corresponds to the portion illuminated by the circular-cross-sectioned bundle of light beams, and provides an information concerning the presence and position of an object.

The above described concept or idea is practically obtained as will be explained hereinafter, in conjunction with FIGS. 13a to 13c.

Figure 13:
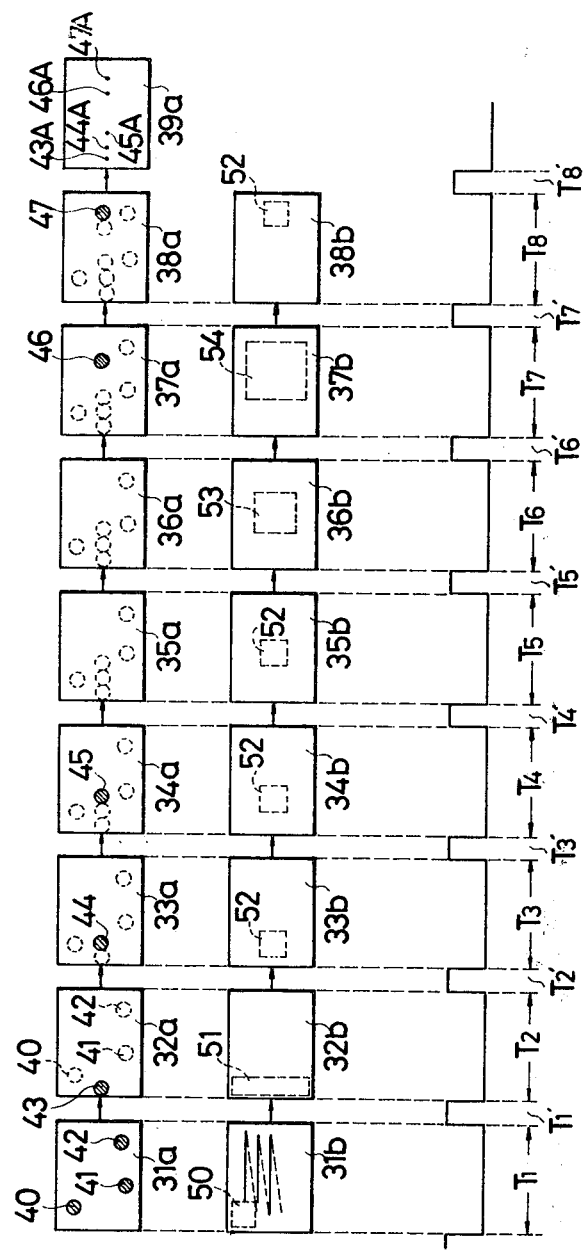

FIG. 13a shows an image including the specific pattern, while FIG. 13b shows a range for identifying the specific pattern of FIG. 13a. FIG. 13c shows the vertical sunchronizing signals for scanning of a television camera for catching the image of FIG. 13a, starting from the left-hand side in sequence.

Those patterns similar to but different from the objective specific pattern, which are found in the imagery surface 31a on the condition that the specific pattern does not exist in the surface 31a, are designated at numerals 40, 41 and 42. During the first cycle T1 of the scanning, the surface is wholly scanned by a region 50 shown in the surface 31b and conventional two-dimension pattern matching is performed, thereby to determine the positions of the centers of the patterns 40, 41 and 42 and to remember these positions. As the field of the television camera is advanced to 32a, a moving specific pattern 43 comes into the field. After the processing by the range 50 is completed, identification in the range designated at 51 in the imagery surface 32b is performed for each field, until the specific pattern is caught thereby. This mode of operation is referred to as the "first mode" or "writing mode" WTM.

The numeral 43 in the imagery surface 32a denotes the moving specific pattern detected by this identification. As the specific pattern 43 is detected, the mode of operation is changed to a second mode (tracking mode: TRM) in which the identification is performed in a region designated at 52 in the imagery surface 33b, to detect a specific pattern 44 on the imagery surface 33b and covered by the range 52. The position of the range 52 in the coordinate can easily be obtained from the scanning period of the television field, provided that the time for passing through the field is given previously.

The specific pattern 45 in the imagery surface 34a is the specific pattern detected in the range 52 of the field 34b. In the field 35a, no moving specific pattern emerges. Thus, no specific pattern is caught by the tracking region in the field 35b expected from the field 34a. Then, the mode of operation is changed to a third mode in which the identification is made in a proportionally stretched or enlarged tracking region 53. This third mode may be referred to as the "stretching mode." As will be seen from the field 36b, this stretching mode with the tracking range of 53 cannot detect the specific pattern. Then, the region is further stretched as designated at 54 in the field 37b, by a further third mode. At this moment, the specific pattern comes to be detected again, as designated at 46 in the field 37a. When the specific pattern which is considered to be the tracked one is detected, the mode of operation is changed again to the second mode, but with the position of the range 52 as shown in the field 38b, which range is effective to detect the specific pattern 47, as shown in the field 38a.

Thus, at first similar but different patterns are detected are stored, under the condition that there is no moving specific pattern in the field. Then, a waiting mode is performed with a relatively wide range of identification until the moving specific pattern emerges or comes into the field. Once the pattern is detected in the range, tracking is preformed by the second mode as long as the specific pattern is moving within the field. When the specific pattern is disappears or gets out of the field, the range is gradually stretched or enlarged at a predetermined rate for performing tracking with the third mode until the specific pattern is caught by the enlarged region again, and then the tracking is preformed by the second mode with the smaller range.

Figure 14:
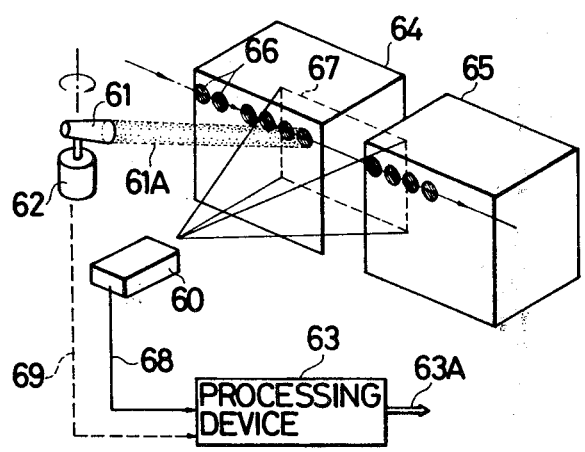

The moving specific pattern is extracted in the above described manner and the positions 43A to 47A of the centers of the specific pattern at each time of detection are determined as shown in the field 39a. FIG. 14 shows a practical example of a circuit for performing the recognition of an object through tracking the object as above described. In FIG. 14, numerals 60, 61 and 62 denote, respectively, a television camera, an illumination device and a motor for rotating the illumination device. A bundle of parallel light beams is designated by numeral 61A.

Numeral 63 denotes a processing device including the tracking means and having an output 63A. Box shaped objects to be recognized are designated by numerals 64 and 65. The bundle 61A of light beams is adapted to produce a spot of a specific pattern 66 on the object. The television camera 60 has a visible field designated at 67. Signal lines 68 and 69 are provided for inputting the imagery signal from the camera 60 to the processing device 63 and for inputting the angular position of the shaft of the motor to the processing device 63, respectively. The specific pattern produced by the bundle 61A, which is circular in the illustrated example, is adapted to scan the object in the direction of the arrow, as the motor 62 is energized. The position and the shape of the object are obtained from the locus of the specific pattern 66 reflected by the surface of the object, in the manner shown below.

At first, those patterns similar to but different from the specific pattern are detected and registered, when the illumination means are not operated or when the light beam projects on the position out of the field 67. Then, the bundle of parallel light beams is positioned and the first mode is performed with a wide range of identification covering an area at which the specific pattern is expected to emerge. Once the specific pattern is recognized, the second mode is performed with a smaller range of identification covering the area at which the specific pattern is expected to emerge for the next time. The tracking is continued as long as the specific pattern is detected at each time of operation. When the second mode loses the specific pattern from its sight, the third, i.e. the stretching mode is commenced to perform the tracking with a stretched region of identification. This third mode stretches the region, at a constant rate for each of the successive cycles of operation, until the specific pattern is again extracted. When the specific pattern is again detected, as a result of the tracking with the third mode, the mode of operation is again returned to the second mode, to repeat the same processing. It is to be noted that only the positions in the coordinate of the moving specific pattern are extracted by the first, second and the third modes.

The described tracking and extraction of the specific pattern provides the positions 43A to 47A in the coordinate of the centers of the detected specific patterns 43 to 47, as shown in the field 39a of FIG. 13a. The positions 43 to 47 in the coordinate is concerned with the position and the shape of the object located at the portion of the object to which the bundle of parallel light beams is directed, and indicates at least that an object or objects exist at portions corresponding to the positions 43A to 47A. The above explained function also provides a highly improved discrimination of the objective pattern from similar detected patterns, which promises a more accurate and efficient tracking and, therefore, renders the recognition device of the invention highly useful for industrial purposes.

Referring to FIG. 13c again, the above described tracking is performed during the time of scanning T1 to T8, while the change of modes and calculation of the forecasted region are made during the flying-back time T1' to T8'.

Figure 15:
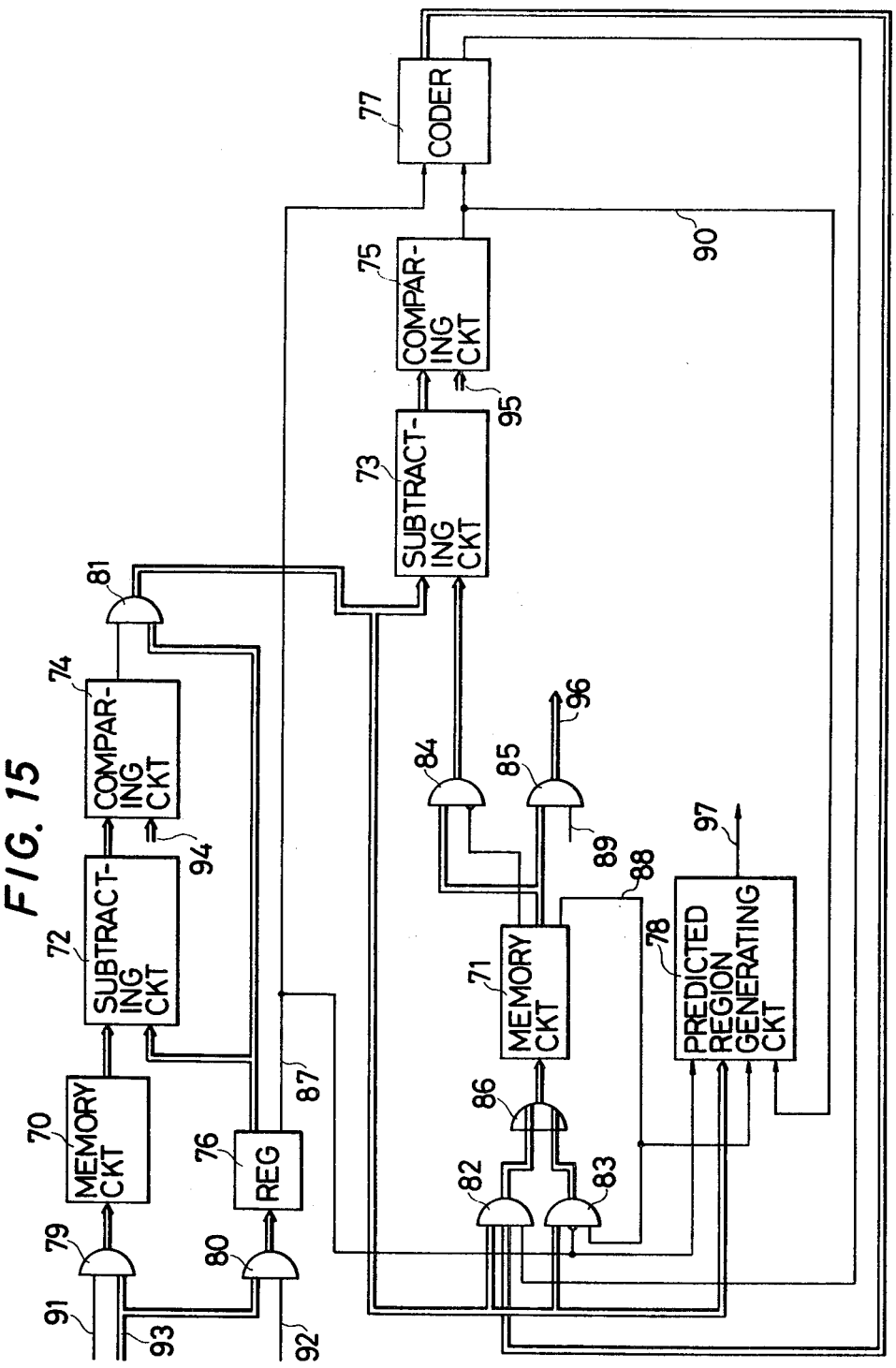
FIG. 15 is a schematic circuit diagram of processing means incorporated in the recognition device of FIG. 14, FIGS. 16a to 16b are schematic illustrations exemplarily showing the generation of a forecast-region provided by the present invention.

FIG. 15 shows a practical example of a circuit for an essential part of the processing device 63 as shown in FIG. 14. In the drawings, numerals 70 and 71 denote memory circuits, 72 and 73 denote substraction-absolute value circuits, 74 and 75 denote comparator circuits, 76 denotes a register of the push down type, 77 denotes a coder, 78 denotes a forecasted region generating circuit, 79 to 85 inclusive and 86 denote logical elements providing the logical product and logical sum of two or three inputs of m bits (x-address bit number) and n bit (y-address bit number), 87 and 88 denote signal lines for outputting signals from the register 76 and the memory circuit 71, respectively, 89 denotes a signal line carrying a predetermined timing signal, 90 denotes a signal line from the coder 77, 91 denotes a signal line carrying a signal indicating that a connection with the specific pattern is achieved at the initial condition, 92 denotes a signal line carrying a signal indicating the achievement of a connection with the specific pattern in the first to the third modes, 93 denotes a signal line carrying a signal indicating the position of the related specific pattern in the x and y axes of a coordinate, 94 denotes a line for inputting a background-separating threshold value, 95 denotes a line for inputting a separation threshold value, 96 denotes a line for outputting the objective coordinate corresponding to the signal line 63A of FIG. 14, and 97 denotes a line for outputting the forecast region.

The signal line 91 is adapted to receive, for example, a signal from the judging circuit 17 of FIG. 6 representing that the connection with the specific pattern is achieved, only at the initial condition. The output from the judging circuit 17 is delivered through the signal line 92 whenever one of the first to the third modes of operation is performed. The signal line 93 receives, for example, signals representative of positions of the center of the specific pattern in the coordinate, which is obtained by substracting a predetermined value from the outputs of the AND gates 23 and 24 of FIG. 6.

An explanation will be made hereinafter as to the manner of operation of the circuit as shown in FIG. 15.

At the initial state, when the specific pattern is out of the field of the television camera 2 or when the illumination of the specific pattern is not commenced as yet, the coordinate signals detected as similar signals are applied to the memory circuit 70, through the AND gate 79, by means of signals carried by the line 91 representing the achievement of the connection with those patterns. This operation is performed at each time of detection of a similar pattern in the background and their positions on the x and y axes of the coordinate are stored by the memory circuit 70.

Then, after these similar patterns are entered, the region generating circuit 78 produces a signal for limiting the region of identification, in the manner to be described. Identification operations are repeated, by means of the device of FIG. 6, until a pattern which may be similar to the specific pattern or may be the specific pattern itself emerges, using the image contained by the limited range for each field. When the specific pattern emerges in the region on the next field, the positional data regarding the specific pattern is entered in the register 76 to be stored therein, through the signal line 93 and the AND gate 80. It is possible to arrange for movement of the region by a predetermined distance when the specific pattern is not detected by the identification for a predetermined number of fields. The input line 92 for the AND gate 80 will carry a signal which is "1" (one) when the specific pattern is detected during this first mode of operation and later detailed second and third modes of operation. When a plurality of specific patterns are detected in the same field during the first mode of operation, all of them are applied to and held by the register 76. As explained, positional data of all of the specific patterns and the similar patterns detected during the first mode is applied to and held by the register 76. A judging operation is then made during the fly-back period T2' so as to judge whether these patterns are not similar background patterns and whether these positions are in a range within which the specific pattern is expected to emerge. Consequently, one of the patterns is selected. Then, the position at which the specific pattern is expected to emerge in the next field is forecast from the position in the coordinate of the center of the selected pattern, thereby to produce the region generating data for the second mode of operation. To this end all of the contents of the register 76 and the memory circuit 70 are compared with each other, so as to select the patterns held by the register 76 which have no correspondence in the content of the memory circuit 70. Thus, the patterns other than those of the background, i.e. the specific patterns are selected to be stored in the memory circuit 71, while the content of the register 76 is erased.

The comparison and storage operations are made in the following order. At first the substraction absolute value circuit 72 performs a substraction of the content of the memory circuit 70 from that of the register 76. The resulting absolute value is then compared with a threshold value delivered through the signal line 94, at the comparator circuit 74. Then, the control line for the AND gate 81 is turned to "1," when the absolute value is judged to be smaller than the threshold value, so as to allow the gate 81 to output the content of the register 76.

Since the signal line has carried a signal "1," due to the previous entry of data in to the register 76, a specific code is output when the signal in the line 80 is turned to "1," and this code is transmitted to the memory circuit 71, through the gates 82 and 86, along with the positional data from the gate 81. Thus, when the specific pattern is detected during the first mode operation, the region determining signal is produced taking the position of the center of the detected specific pattern into account, for the subsequent second-mode operation. In the second-mode operation, as the specific pattern is detected in the region, the positional information, i.e. the position in the coordinate is put into the line 93, and is transmitted to the register 76, through the AND gate 80, to be held thereat. The circuits 72 and 74 perform the comparison of the contents between the register 76 and the memory circuit 70, during the period of the fly-back time soon after the scanning of the field, in the same manner as the previous comparison. Thus, the content of the register 76 is output through the gate 81, only when there is a difference between the compared contents. In the case of the second-mode operation, the output from the gate 81 constitutes one of the inputs to the substraction absolute value circuit 73, while the other input to the circuit 73 is constituted by the positional information of the pattern detected in the preceding field which is applied to the circuit 73 by the memory circuit 71, through the ANd gate 84.

The circuit 73 performs an additional of a forecast or expected displacement to the positional data given by the memory circuit 71 and acts to provide an absolute value of substraction between the resulting positional data and that delivered from the line 81. The comparator circuit 75 then compares the absolute value with the value delivered from the input line 95, the resultant value of which is input to the coder 77. Thus, as has been explained, a judgement is made as to whether the relationship between the previously detected position and the presently detected positions is the predetermined one, thereby to turn the output from the comparator 75 to "1" when the relationship is correct and to "0" when the relationship is not correct. The coder 77 outputs specific codes to the gate 82 depending on whether the output from the comparator 75 is "1" or "zero,". At the same time, the gate 82 is opened by the signal delivered from the controlling signal line 80, so that the presently detected positions in the coordinate from the gate 81 is input to the memory circuit 71 through the gate 86 along with the specific code. The gate 82 is adapted to be opened by the signal on the line 80 and to simultaneously take the outputs from the gate 81 and the coder 77. The specific code is a coded specific relationship between the previously and presently detected positions adapted to be used in judging whether the presently shown relationship is reasonable. This coded relationship is stored along with the positional data to be used as a flag when it is required to read only the data corresponding to the code. In the second-mode operation, the above described operation is repeated to input the positional data of the specific patterns at each time of detection along with the specific code. When the specific pattern is lost from the field during the second-mode operation, the mode is changed to the third mode of operation in which the region of identification is progressively stretched for each successive field, taking the positional information of the last specific pattern in the second-mode operation, until the specific pattern again falls in the field. In this case, the identification is performed in a similar manner as in the second-mode operation, by a region signal output from the forecast region generating circuit 78 to the signal line 97. As the specific pattern is caught during the third-mode operation, the mode is returned again to the second mode, and the described operation is continued unless the specific pattern is lost once again.

According to the device of the invention, since the existence of the object and the continuity of detection thereof are tracked by means of the forecast region in the field so as to provide a secure confirmation of the detected data, an improved discrimination of the specific pattern from the other false patterns, as well as an enhanced accuracy of the tracking is ensured, over conventional devices.

In the foregoing embodiment only those patterns satisfying a specific relationship with the previously detected specific pattern are judged, among the newly emerging specific patterns, to be the specific pattern. Alternatively, the arrangement may be such that what emerges in the forecast region is judged to be the specific pattern.

Figure 16A:
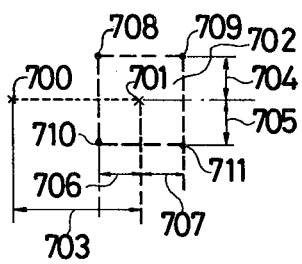
Figure 16B:
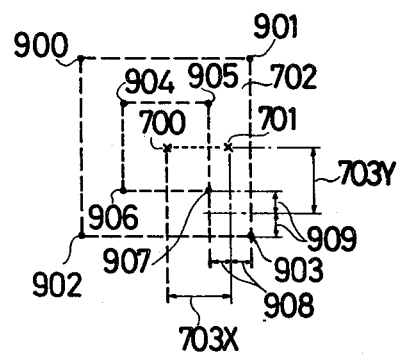

FIGS. 16a and 16b show the a manner in which the tracking region is generated, in which FIG. 16a specifically shows an example of an uni-dimensional movement of the specific pattern in the field, while FIG. 16b serves to show an example in which the specific pattern performs a two-dimensional movement.

Referring at first to FIG. 16a, numeral 700 denotes the position in the coordinate of the center of the presently detected specific pattern, 701 denotes the position of the center of the forecast region for the next scanning, 702 denotes the forecast region, 703 denotes the distance between the presently detected center and the forecast center, 704 to 707 respectively denote the distances defining the forecast region from the forecast center, and numerals 708 to 711 denote, respectively, positions in the coordinate system of the four corners of the forecast region. The forecast region 702 of FIG. 16a is generated when the specific pattern moves uni-dimensionally. When a specific pattern is detected within the region 702 in the subsequent field, the specific patterns are judged to be of a certain continuity. The distance 703 is suitably selected corresponding to the speed of movement of the specific pattern. Thus, when the speed is constant, the distance 703 is selected to be a constant conforming to the speed, while the history of the speed of the specific pattern is taken into consideration when the speed is varying. Although the forecast region is shown to be rectangular in the illustrated embodiment, this is only for the purpose of simplification of the discription, and it is possible to adopt other shapes in accordance with the nature of the movement of the specific pattern. In FIG. 16b corresponding portions to those of FIG. 16a are designated by the same numerals. Numerals 908 and 909 denote the lengths corresponding to the lengths 704, 705 and 706, 707 in FIG. 16a for defining the forecast region. Numerala 900 to 903 denote the position in the coordinate system of four corners of the forecast region for the next scanning, while the corners of the preceding forecast region are denoted by numerals 904, to 907. The forecast region 702 of FIG. 16b spreads around the presently detected position 700, and the specific patterns detected in this region are judged to be of a certain continuity and thus are used as the object of the tracking.

Needless to say, the region may have any desired shape, corresponding to the nature of the movement of the specific pattern, as is the case of the example of FIG. 16a.

Figure 17:
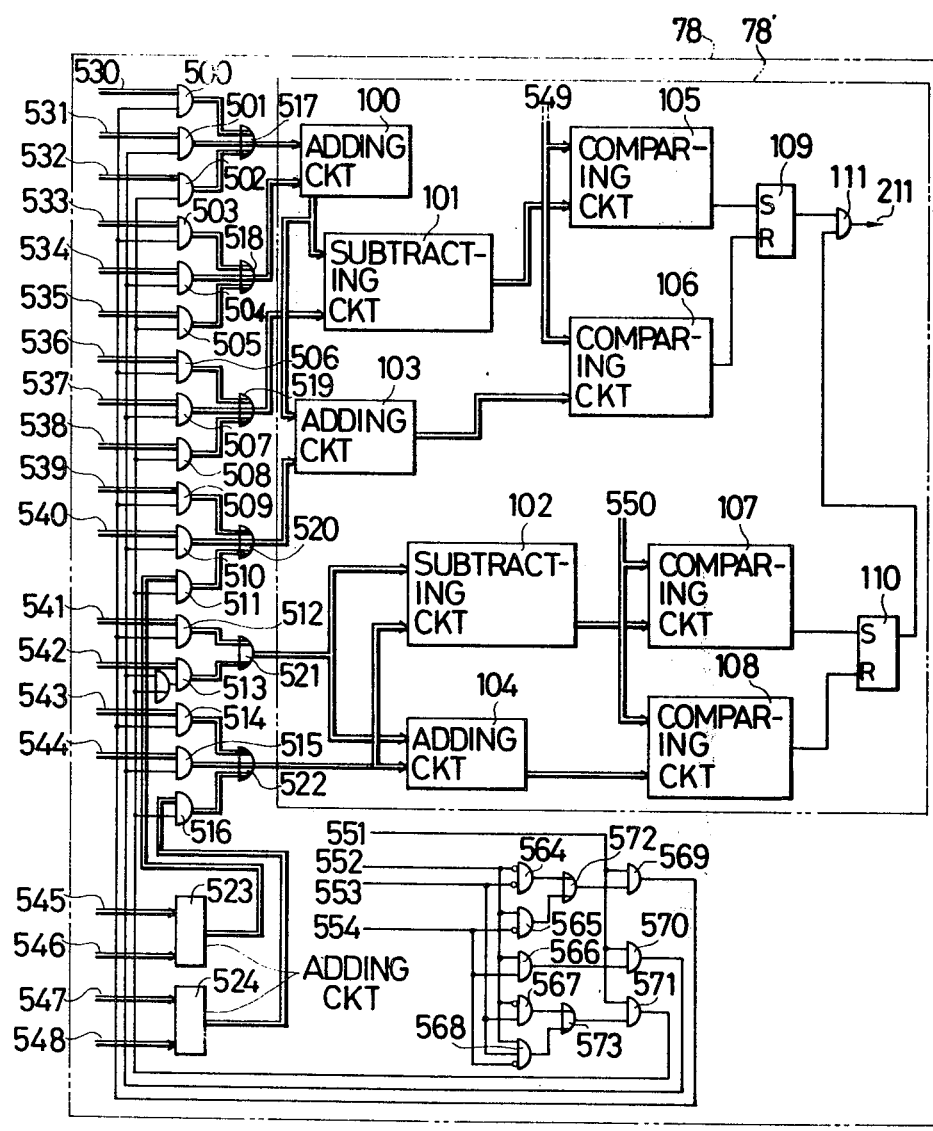
FIG. 17 is a schematic circuit diagram constituting a part of the circuit of FIG. 15.

FIG. 17 shows the predicted region generating practical example of a circuit 78 of FIG. 15, for generating the forecast region as shown in FIG. 16a.

For generating the forecast region of FIG. 16a, the input data is changed so as to conform the mode of operation now performed and is adjusted to generate a signal of "1" level at the positions of the coordinate system at which the identification must be made.

For the purpose of simplification, assumptions are made as follows. The content of the register is represented by 76 and by $\overline{76}$ when all of the content is zero. The fulfillment and nonfulfillment of the comparison by the comparator circuit 75 are represented by 75 and $\overline{75}$, respectively. Signal $\overline{71}$ represents that the contents of the memory circuit 71 are zero. These signals are input to the forecast region generating circuit 78, through the circuits 74, 75 and 76.

The requisite for the first mode operation (WTW) is given by: $WTM = \{(\overline{76}) \wedge (\overline{71}) \vee (76) \wedge (\overline{75})\}$ while the requistes for the second and the third modes (TRM), (SCM) of operation are given respectively, by:

$TRM = (76) \wedge (75)$ $SCM = (71) \wedge \{(\overline{76}) \vee (76) \wedge (\overline{75})\}$ where, and represent, respectively, a logical product and a logical sum. These requisites are judged by inputting the elements into the circuit 78.

In FIG. 17, numerals 100, 103, 104, 523 and 524 denote, respectively, adding circuits, while 101 and 102 denote subtraction circuits. Flip-flops circuits are designated at numerals 109 and 110. Each of the numerals 500 to 516 denotes a two-input logical product circuit for p bits, and numerals 564 to 571 denote two or three-input logical product circuits, while three-input logical adding circuit for p bits is designated by each of the numerals 517 to 522 inclusive. Numerals 572 and 573 are two-input logical adding circuits, while numeral 111 denotes a two-input logical product circuit. Numerals 530 to 548 denote signal input lines for p or q bits, while signal input lines each for 1 bit are denoted by numerals 551 to 554. Signal input lines 549 and 550 are provided for inputting certain threshold values.

The aforementioned judgement or the selection of the mode of operation is performed as follows. The signal 76 on the line 87 leading from the register 76 is applied to the signal line 552, while the signal 71 on the line 88 leading from the memory circuit 71 is applied to the signal line 553. The signal 75 from the comparator circuit 75 is delivered to the signal line 554. At the same time, a controlling signal is transmitted through the signal line 551, so that the logical circuits 564 to 573 may perform calculations to output a signal "1" at the gate 569 for the first mode of operation, at the gate 570 for the second mode of operation and at the gate 571 for the third mode of operation. The mode a selection signal thus obtained is effective to open the corresponding gates among the gates 500 to 516 and their outputs are delivered through gates 517 to 512 to the circuits 100, 101, 102, 103 and 104. The signal lines 530 to 548 carry, respectively, the following signals, when represented by the number in coordinate of FIG. 16a. Thus, the line 530 carries a signal 701x (position of 701 on the x-axis of the coordinate) which is a constant used in the first mode of operation, while 531 carries a signal of 700x adapted for use in the second mode of operation. The line 532 carries a signal for the third mode represented by $\overline{700x}$ which is the position of 700 detected in the preceding field on the x-axis of the coordinate. The signal 703 carried by the line 533 for the first mode is made zero. The line 534 carries a signal for the second mode represented by 703, while the line 535 carries a signal for the third mode which is made zero. Lines 536, 537, 538 and 539, respectively, carry signals 706 for the first mode, 706 for the second mode, 706 for the third mode and 707 for the first mode. The line 541 carries a signal 701y for the first mode which is the position of 701 on the y-axis of the coordinate. The line 542 is for $\overline{700y}$ for the second and the third modes. Line 543 carries signals 704 and 705 for the first mode. The line 544 carries signals 704 and 705 for the second mode. The line 545 bears a signal $\overline{707}$ for the third mode. The line 546 bears a signal representative of a stretching value in the direction of 707 for the third mode. The line 547 carries signals $\overline{704}$ and $\overline{705}$ for the third mode and the line 548 carries a signal representative of a constant stretching in the direction of 704 and 705 for the third mode.

These signals are formed by the coordinate signals delivered from the gate circuit 81.

The operation during the second mode will be explained for the purpose of illustration, with specific reference to FIGS. 16a and 17. Referring to FIG. 17 input gates 501, 504, 507, 510, 513 and 515 are selected to pass the input data to the circuits 100, 101, 102, 103 and 104, through the gates 517 to 522. The adding circuit 100 is adapted to output the sum of the contents of the signal lines 531 and 534. Thus, the adding circuit 100 performs an addition of 700x to 703 to output the resulted 701x. The substraction circuit 101 is adapted to substract the content of the signal line 537 from the output of the adding circuit 100 and outputs the obtained difference. Namely, 706 is subtracted from 701x, in the circuit 101, and the resulting value of 701x is output from the circuit 101. The adding circuit 103 performs an addition of the output from the circuit 100 to the content of the line 540 and outputs the value of 711x. The subtraction circuit 102 is adapted to subtract the content of the line 544 from the content of the line 542 to produce an output of 708y. The adding circuit 104 is adapted to produce an output of 710y which is the sum of the contents of the signal lines 542 and 544.

Under these circumstances, in the scanning of the subsequent field, the value of the x-coordinate and the value of the y-coordinate of the point of the scanning is provided. The comparator circuit then compares the content of the circuit 101 with the content of the signal line 549 and outputs a signal of "1" when the contents conform to each other, thereby to set the flip-flop 109. The comparator circuit 106 meanwhile compares the contents of the circuit 103 and the line 549 so as to output a signal of "1" level when the coordinates of both contents coincide with each other, thereby to reset the flip-flop 109. Thus, the output from the flip-flop 109 is "1" between points 710x and 711x of FIG. 16a. Similar processing is performed also as to the y-axis direction, by means of circuits 102, 104, 107, 108 and 110, so as to produce an output of "1" from the flip-flop 110 between points 708y of FIG. 16a. The outputs from the flip-flops 109 and 110 are then applied to the gate 111, so that the gate 111 produces a signal 211 of "1" level only when the outputs from both of the flip-flops are "1," i.e. only when the scanning is performed in the region 702 of FIG. 16a. The manner of operation of the first mode is similar to that of the second mode, excepting that a different input data is used to obtain a larger region 51, as shown in the field 32b of FIG. 13b. The third mode is performed almost in a similar manner. However, for performing the stretching function, the previously detected position 700x, as well as the values 703, 710 and 706 is held unchanged, while the values 707, 704 and 705 are increased by a constant value at each time of changing of the field. These increases are performed by the circuits 523 and 524. Alternatively, the value 703 of the line 533 is kept at a predetermined value, and the region in the first mode is shifted by a predetermined distance.

Figure 18:
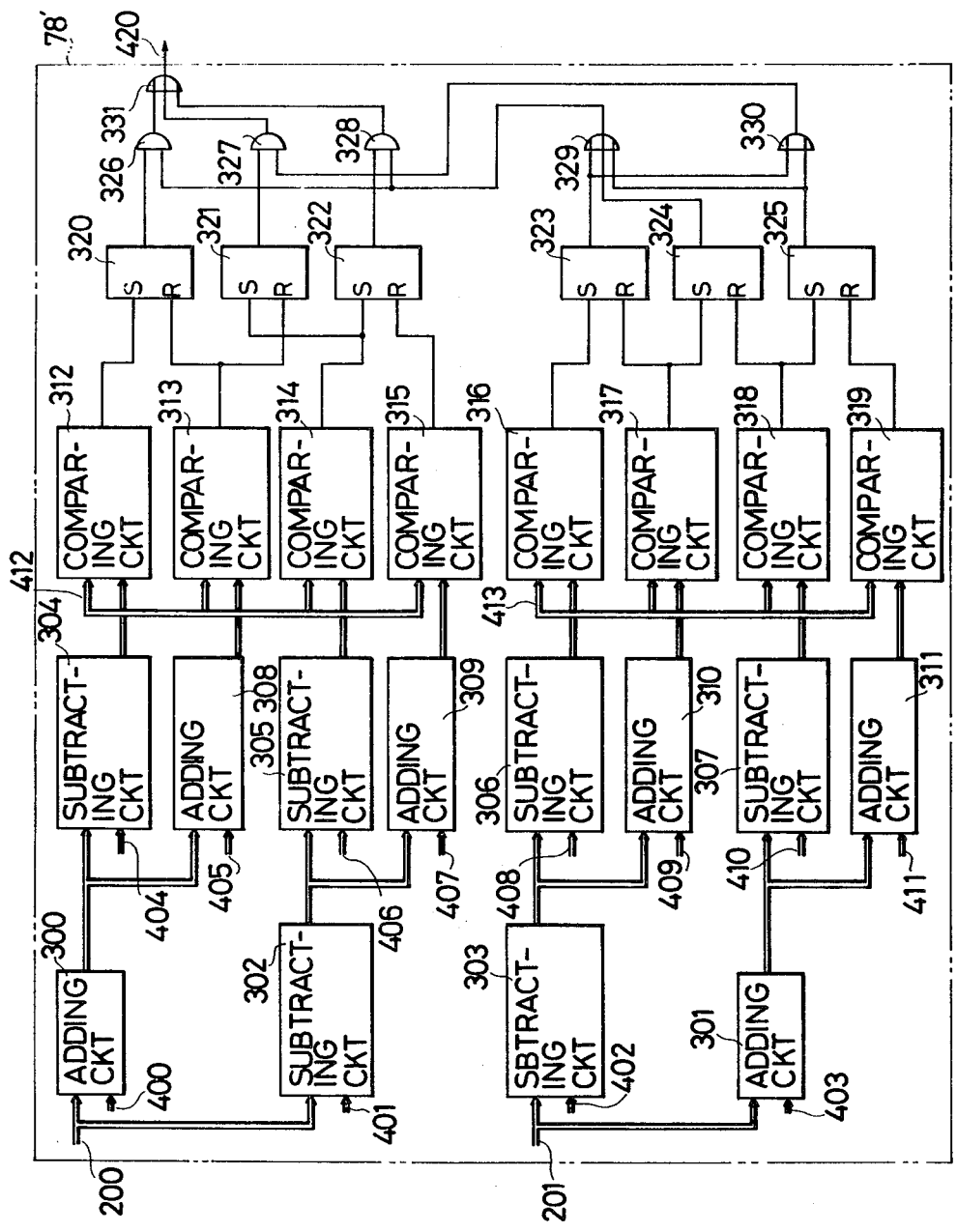
FIG. 18 is a circuit diagram of a modification of the circuit of FIG. 17.

FIG. 18 shows a modification of the part 78' of the circuit of FIG. 17 and is adapted to generate the region 40 of FIG. 16. Referring to FIG. 18, numerals 300, 301 and 308 to 311 denote adding circuits, while numerals 302 to 307 represent operation circuits. Numerals 320 to 325 denote flip-flops, 326 to 328 denote AND gates, 329 to 311 denote OR gates, 200 and 201 denote are signal input lines for the 700x and 700y of FIG. 16b, 400 and 401 are input signal lines for 703x, 402 and 403 denote signal input lines for 703y, 404 to 409 denote signal input lines for 908, 408 to 411 denote signal lines for 909, 412 and 413 are signal input lines for inputting the x and y coordinates of the scanned region at each moment and 420 denotes a signal output 1 ne.

The signals are generated by similar circuits to those of FIG. 17. In this example, it is necessary to develop the forecast region in the plus and minus direction for both of x and y axes, around the position presently detected. Circuits 300, 304, 308, 312 and 313 for developing the region in the plus direction along the x-axis are put in parallel with the circuits 302, 305, 309, 314, and 315 for developing the region in the minus direction along the x-axis. Similar arrangements are provided for developing the region along the y-axis.

Consequently, the flip-flop 320 of FIG. 18 produces a signal which is "1" for the range between 905x and 901x of FIG. 16b, while the flip-flop 322 outputs a signal which is "1" for the range between 900x and 904x. The flip-flop 321 outputs a signal which is "1" for the range between 904x and 905x. Concerning the y-direction the flip-flop 323 outputs a signal which is "1" for the range between 900y and 904y, while the flip-flop 325 ouputs a signal which is "1" for the region between 906y and 902. The flip-flop 324 provides an ouput which is "1" for the range between 904y and 906y.

The gates 326 and 329 perform the operation $$(320x) \wedge \{(323y) \vee (324y) \vee (325y)\}$$

so that "1" is output in the region defined by the extension of 905 and 907, the extension of 901 and 903, the extension of 900 and 901 and by the extension of 902 and 903 of FIG. 4b.

Similarly, the gates 327 and 330 perform an operation $$(321x) \wedge \{(323y) \vee (325y)\}$$

so that an output of "1" is obtained within the region defined by extensions of lines 900 to 901, 904 to 906, 904 to 906, and 905 to 907, and within the region defined by extensions of lines 906 to 907, 902 to 903, 904 to 906 and 905 to 907.

Also, the gates 328 and 329 operate to provide an output of "1" within the range defined by extensions of lines 900 to 902, 904 to 906, 900 to 901 and 902 to 903. These outputs are logically added at the gate 331 which then outputs a signal which is "1" in the region 702 of FIG. 16b, to the signal line 420.

Although the specific pattern has been described to be circular, this is not exclusive and various patterns may fairly be adopted, such as a rectangular pattern, cross-shaped pattern, or a oval pattern.

What is claimed is:

1. A recognition device for recognizing the shape and the position of an object comprising:
   first means for applying a bundle of substantially parallel light beams having a predetermined cross-sectional shape to a space containing said object; second means for receiving the light information in the visual field including at least the portion to which said bundle of parallel light beams is applied and for converting the light information into image signals; third means for progressively picking up selective successive portions of said image signals; fourth means for comparing partial patterns of the respective portions picked up by said third means with at least one reference pattern corresponding to the shape of the cross section of the bundle of light beams and for producing a signal representative of the conformity of the partial pattern and the reference pattern; and fifth means for detecting the position of the picked-up portion in the visual field when the coincidence is detected by said fourth means, thereby recognizing the shape and the position represented by the information detected by said fifth means.

2. A recognition device as claimed in claim 1, wherein said fifth means includes sixth means for producing a signal representative of the position of the portion of the object being picked-up and seventh means for outputting said signal produced by said sixth means upon receipt of said signal produced by said fourth means.

3. A recognition device as claimed in claim 1, wherein said third means includes means for converting said image signal from said second means into a binary signal, sampling means for sampling said binary signal, register means for storing successive portions of said binary signal, said fourth means including judging means for comparing a signal pattern stored in said register means with the reference pattern to produce a signal representative of conformity of both patterns, and said fifth means including counter means for producing signals representative of the coordinate positions of said portions stored by said register means and outputting means for outputting said signals representative of said positions upon receipt of said signal from said judging means representative of the conformity detected thereby.

4. A recognition device as claimed in claim 1 wherein said first means includes means for shifting the direction of said bundle of parallel light beams.

5. A recognition device as claimed in claim 1, wherein said first means includes means for producing a bundle of parallel light beams, mirror means for deflecting said bundle of light beams issued from said first mentioned means and means for rotating said mirror means thereby to change the direction of said bundle of parallel beams.

6. A recognition device as claimed in claim 5, wherein said first means further includes means for changing the direction in which said bundle of parallel light beams is issued from the beam-producing means.

7. A recognition device for recognizing the shape and the position of an object comprising first means for applying a bundle of substantially parallel light beams of predetermined cross-sectional shape to a space containing said object; second means for converting the light information in the visual field including at least the portion to which said bundle of parallel light beams is applied into image signals at a predetermined period of repetition; third means for extracting a specific pattern in the visual field, coincident with at least one reference pattern corresponding to the shape of the cross section of the bundle of light beams for each of said periods and for determining the coordinate of the position of the extracted specific pattern; and fourth means for judging the difference between the coordinate of the specific pattern extracted by said third means at a specific period and the coordinate of the specific pattern extracted by said third means in a period proceding the said specific period, only within a limited region of the visual field.

8. A recognition device as claimed in claim 7, further comprising means for determining said limited region for said fourth means in accordance with the manner in which said specific pattern moves.

9. A recognition device as claimed in claim 7, wherein said fourth means includes first memory means for storing a first coordinate extracted by said third means during a first period preceding the application of said bundle of parallel light beams by said first means, second memory means for storing a second coordinate extracted by said third means during a second period after said application, and comparing means for determining the difference between said first and second coordinates.

10. A recognition device as claimed in claim 9, wherein said fourth means further includes third memory means for storing a third coordinate obtained in said second period which provides said difference when compared in said comparing means, judging means for determining whether a predetermined requirement is satisfied by the relationship between said third coordinate stored by said third memory means and a fourth coordinate obtained in a third period subsequent to said second period which provides said difference when compared in said comparing means, and forecasting means for predicting said region for said fourth means in a fourth period subsequent to said third period in accordance with said fourth coordinate determined by said judging means to satisfy said requirement.

* * * * *